May 7, 1929.                R. WHITCOMB                 1,712,185
                       COLLAPSIBLE LUGGAGE CARRIER
                     Filed March 19, 1926    2 Sheets-Sheet 1
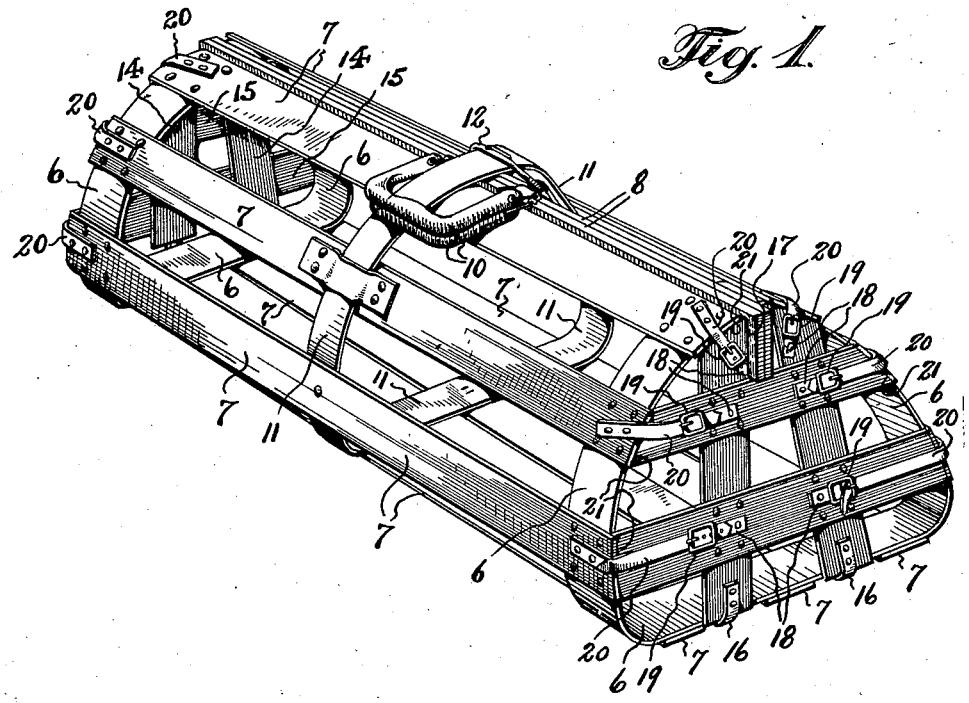
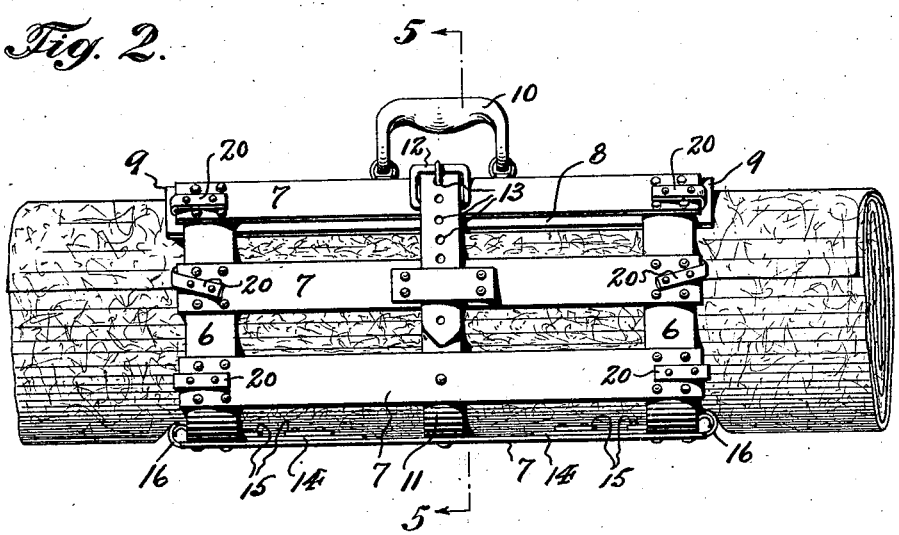
INVENTOR
Russell Whitcomb,
BY
Frantzel and Richards
ATTORNEYS

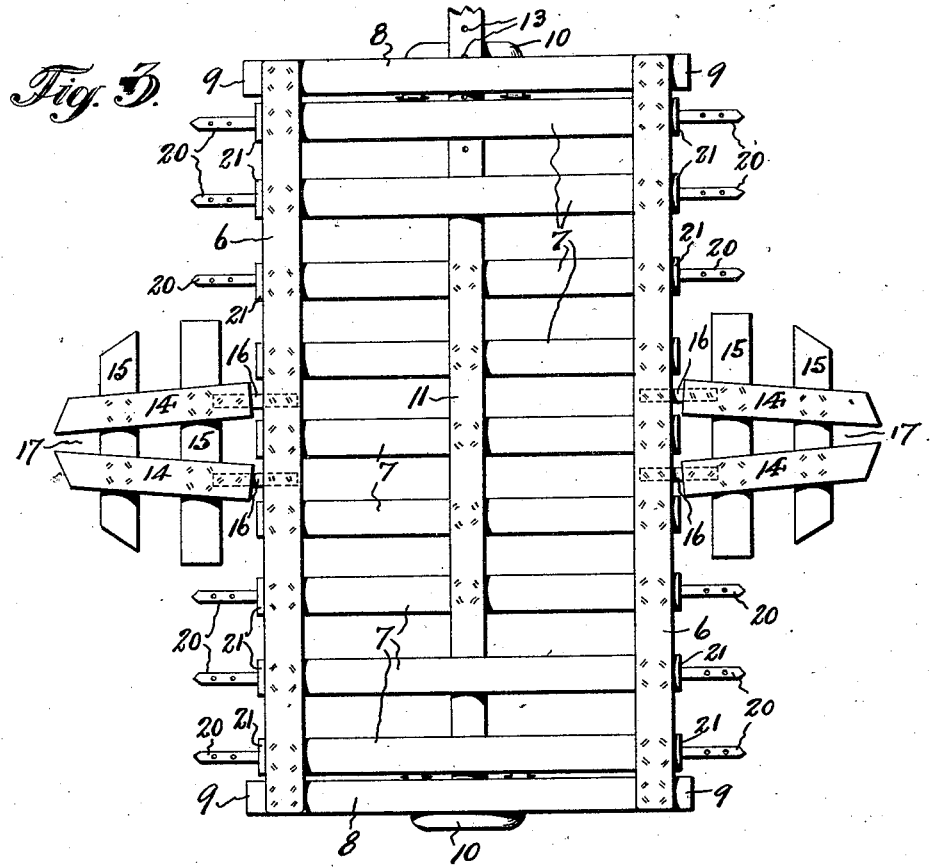

Patented May 7, 1929.

1,712,185

UNITED STATES PATENT OFFICE.

RUSSELL WHITCOMB, OF NEW YORK, N. Y.

COLLAPSIBLE LUGGAGE CARRIER.

Application filed March 19, 1926. Serial No. 95,888.

This invention relates, generally, to an improved collapsible bag or carrier; and the invention has reference, more particularly, to a novel construction of relatively light weight frame-less bag or carrier which may be selectively arranged as an open ended blanket roll carrier or as a kit bag of conventional shape with closed ends, and which, when not in use may be collapsed and folded up into comparatively small bulk, so as to be capable of being packed away in a traveling trunk, or conveniently stored away when not in use.

The invention has for its principal object to provide a novel construction of collapsible carrier or bag, of the kind above mentioned, which is made up in a lattice-like structure from leather, fiber or any other suitable material, so that when set up in a desired selected form or arrangement, the same not only provides a strong and capacious carrier or receptacle, but one which is also ventilated, so that the same is of particular advantage in carrying about blankets, steamer rugs, overcoats, raincoats and other articles with which travelers are frequently encumbered, as well as for general use as a handy and capacious receptacle for any other desired purpose.

The invention has for a further object to provide a collapsible carrier of the kind above mentioned, which does not require metallic frames or similar structural features, and yet being so constructed and arranged, that it will not only retain the particular shape in which it may be set up, but will also afford a strong and durable construction; and, furthermore, the novel construction and arrangement of its parts provides a carrier which is easily and quickly manipulated into either set-up or collapsed condition as the case may be.

Other objects of this invention not at this time more particularly enumerated, will be clearly understood from the following detailed description of the same.

The invention is clearly illustrated in the accompanying drawings, in which:—

Figure 1 is a perspective view of the novel carrier when set up in the form of a kit bag of conventional shape with closed ends; Figure 2 is a side elevation of the novel carrier when set up in the form of an open ended blanket roll carrier; Figure 3 is a plan view of the carrier in collapsed condition from which it may be folded up into a relatively flat compact form of comparatively small bulk; Figure 4 is a transverse section through the carrier when set up in the form of a kit bag as shown in Figure 1; and Figure 5 is a transverse section taken on line 5—5 in Figure 2.

Similar characters of reference are employed in all of the hereinabove described views, to indicate corresponding parts.

Referring now to said drawings, my novel collapsible carrier consists in a lattice-like structure comprising a substantially rectangular main body section and foldable end members suitably connected therewith. Said main body is formed by the provision of transverse outlying comparatively flexible flat carrier strips or slats 6, which are spaced apart in parallel relation for a distance approximating the length of the carrier or bag desired. Interconnecting the said transverse carrier strips or slats 6 are a plurality of longitudinal suitably spaced apart body strips or slats 7, the latter being disposed against the outer faces of said carrier strips or slats 6, and secured thereto by any desired means of permanent fastening, such e. g. as rivets. Similarly secured to and interconnecting the respective longitudinally opposed outer extremities of said carrier strips or slats 6 are longitudinal marginal slats or members 8, the extremities 9 of which project outwardly beyond the outer margins of said carrier strips or slats 6 to provide tongues, the advantage of which will subsequently appear. Preferably said marginal slats or members 8 are of substantially increased thickness compared to the thickness of the body strips or slats 7 or the carrier strips 6, and consequently the same are relatively stiff, whereby they easily support the main body when in its set up bag or carrier form. Secured to the inner edges of the respective marginal slats or members 8, in a central position intermediate their ends, are suitably attached handle or grip members 10. Disposed in parallel relation to and intermediate said carrier strips or slats 6 is a secondary carrier strip or slat 11, the intermediate portion of which is secured to the inner sides of the intermediate body strips or slats 7 by suitable fastening means, such e. g. as rivets. The free ends of said secondary carrier strip or slat 11 are disposed to extend over the outer sides of the outlying body strips or slats 7 and the marginal slats or members 8, and are not secured thereto but merely overlie the same. One free end of said secondary carrier strip or slat is provided with a buckle 12 or other similar fastener with which the opposite free end of said secondary carrier strip or slat may be cooperatively secured in coupled or fastened relation, and to such purpose said latter free end may, if desired, be provided with buckle-tongue receiving perforations 13.

It will be understood that, although the drawings show but one intermediate carrier strip or slat, I may nevertheless provide more than one of the same, accordingly as such additional strips or slats may be desirable, especially in connection with large sizes of my novel carrier or bag; or if desired I may provide additional carrier strips or slats similar in kind and attached arrangement to the main carrier strips or slats 6.

It may here be pointed out that the several strips or slats above described may be selectively made from a variety of materials, which are characterized by the desired degree of flexibility, I prefer, however, to make the said strips or slats out of comparatively heavy leather, similar for example to leather commonly known as leather belting.

The end members of my novel carrier preferably comprise a plurality of substantially vertical slats 14 and horizontal slats 15 permanently fastened together by any suitable means, such e. g. as rivets. The ends of the assembled vertical and horizontal slats 14 and 15 are shaped so as to provide a general peripheral contour of end member, adapted to give the desired more or less conventional shape to the carrier, when the same is set up to form a bag with closed ends. It will be understood, however, that I do not necessarily limit myself to the lattice form as to the end members since they may also be made in integral sheet or solid form if desired. Said end members are hingedly connected with the main body section in a central position relative to each transverse end thereof. The hinge-like connections for said end members may be variously made. As shown in the drawings the connections, in one form, may comprise flexible straps or links 16, fixed by one of their ends to a carrier strip or slat 6, by rivets or other suitable fastening means, and fixed by their other ends to the lower portions of the vertical slats 14, also by rivets or other desired fastening means. The spaced apart upper end portions of the vertical slats 14 of each end member provide vertical upwardly open receiving sockets 17, bounded at their lower or inner ends by the upper horizontal slats 15. The purpose of the receiving sockets 17, thus provided will subsequently appear.

Secured to exterior sides of the vertical and horizontal slats 14 and 15 of the respective end members, by suitable supporting straps 18 are buckle-members 19, or any other suitable separable fastener means. In like manner secured to the outer faces of the respective extremities of the outlying body strips or slats 7 are perforate strap tongues 20 for separable coupling engagement with corresponding buckle-members 19 of said foldable end-members.

When it is desired to set up the novel carrier in the form of a bag with closed ends (as shown in Figures 1 and 4 of the drawings), the end members are turned on their hinge-like connections to up-standing or substantially vertical positions, and thereupon the opposite outlying side portions of the main body section are then up-turned, so that the perforate strap-tongues 20 may be cooperatively engaged with the buckle members 19, to hold the parts in operative set-up condition as shown in Figure 1. In order to aid in maintaining the described set-up relation of the parts, the arrangement is such, that the outer marginal edge of the carrier strips or slats 6 provide shoulders against which the free end portions of the slats 14 and 15 of the end-members may be engaged to reenforce or brace the same in the desired upstanding end closing relation to the bag formation; and at the same time, certain of the body strips or slats 7 are provided at their extremities with projecting portions extending beyond the outer marginal edge of the carrier strips or slats 6 to furnish shoulders 21 to abut against the ends of the slats 14 and 15 of the end members, to thus properly support and position the up-turned side portions of the main body section when in set-up condition.

In using the carrier, when thus set up in bag-like form, the separable ends of the secondary carrier strip or slat 11 being uncoupled, and the cooperative strap tongues 20 and buckle-members 19 at the upper ends of the vertical slats 14 of the end members being also uncoupled, the mouth of the carrier may be opened in the ordinary way, by turning back the released portions of the sides, so that desired articles may be packed into the thus formed carrier. It will also be understood that my novel construction of carrier, when set up in bag-like form, also lends itself to opened arrangement in several ways, which may be convenient when making use of the same. For example, one side portion may remain in secured together relation to the end members, while the other side portion is released so as to open the carrier throughout the entire extent of one side; and again one end member and both side portions of the main body section may remain in secured together relation, while the other end member is released so as to open the carrier from an end thereof. It will thus be apparent that the novel construction easily lends itself to a variety of opened arrangements selectively usuable as may be especially convenient under given circumstances of use.

When the carrier, thus set up into bag-like form, is packed, and it is desired to entirely close the same, the user turns into inwardly and downwardly directed position the marginal slats or members 8 with their outer faces abutting, thus bringing the same into longitudinally central position relative to the set-up body, and with the handles or grips 10 exposed for use in the conventional manner. At the same time the tongues 9 formed by the projecting extremities of said marginal slats or members 8 will be receivable in the receiving sockets 17 of the end members, thus not only aiding in securing the closed side portions of the main body section against gaping, but also providing a comparatively rigid longitudinal support for the weight of the carrier when suspended from the handles or grips 10, without necessity for the use of metallic frames or other forms of reenforcing elements common to ordinary bag structures. When the parts are disposed as above described, and all of the coupling fastener connections intermediate the main body section and end members operatively secured together, the free ends of the secondary strip or slat 11, which are exteriorly disposed at the upper portion of the resulting bag-like structure, are thereupon mutually fastened together by means of the buckle 12 and perforate tongue 13, thus strongly securing the set up bag-like form in operative closed condition.

Owing to the lattice-like structure, and the entire absence of metallic frames or other reenforcing devices, the bag-like carrier, produced as above described, is of comparatively light weight, while at the same time being adapted to provide a generously capacious interior space for the reception of articles, garments or the like desired to be packed and carried therein. Furthermore, the lattice-like construction assures a complete and thorough ventilation of the interior space, a feature of considerable advantage, when it is desired to carry damp clothing or the like, as frequently becomes necessary when traveling, or in connection with sports-clothes changed after play.

Referring now to Figures 2 and 5 of the drawings, I have illustrated another convenient form into which my novel carrier may be set up, the same being in the nature of a blanket roll carrier. When thus using the carrier, the end members are uncoupled from connection with the side portions of the main body section, and are turned on their hinged connections inwardly and flatly over the latter. A roll of blankets, steamer rugs or similar articles may then be deposited across the main body section, and thereupon the side portions of the latter turned upwardly around the roll, bringing the marginal slats or members 8 into downwardly inturned face to face abutting relation, with the handles or grips 10 exposed for use in the conventional manner. When thus arranged, the free ends of the secondary strip or slat 11 are mutually fastened together by means of the buckle 12 and perforate tongue 13, thus not only securing the main body section in enveloping relation to the blanket roll, but also tending to depress the down and inwardly turned marginal slats or members 8 into gripping engagement with the enclosed blanket roll, whereby all tendency of the latter to endwise slip or displacement is eliminated, and a convenient, safe and compact carrier for the roll therefore provided.

When my novel construction of carrier is collapsed, by unfastening the separable connections between its end members and body section, and the meeting margins of the latter, so that parts assume a flat completely opened position, such as illustrated in Figure 3 of the drawings, the same may be folded up into a compact collapsed body of small bulk, by turning in the end members, and then folding inwardly and flat-wise upon itself the side portions of the main body section, all in a manner clearly evident. When thus reduced to collapsed and interfolded small bulk, the carrier will occupy comparatively little space, and consequently may be packed away in a trunk, closet, or otherwise conveniently stored until need for the same arises.

It will be understood that many variations in the above-described construction of parts making up my novel collapsible carrier, as well as changes in detail construction in the cooperative fastening devices thereof, may be made without departing from the scope of my invention as set forth in the following claims; hence, I do not limit myself to the exact combinations and arrangements of the various devices and parts making up my novel collapsible carrier which are described in the foregoing specification, and illustrated in the accompanying drawings.

I claim:—

1. A collapsible carrier, comprising a main body section having flexible transverse carrier slats interconnected intermediate their ends by spaced longitudinal body slats, and by longitudinal marginal members at their ends; said marginal members having hand grip members secured to their intermediate portions; end members hingedly connected to the intermediate portions of the transverse ends of said body section; and cooperative separable fastener devices connected with and adapted to secure said end members and main body section in set up relation.

2. A collapsible carrier, comprising a main body section having flexible transverse carrier slats interconnected intermediate their ends by spaced longitudinal body slats, and by longitudinal marginal members at their ends; said marginal members having hand grip members secured to their intermediate portions; end members hingedly connected to the intermediate portions of the transverse ends of said body section; cooperative separable fastener devices connected with and adapted to secure said end members and main body section in set up relation, and fastening means connected with said main body section for securing said marginal members thereof in meeting relation when said carrier is operatively set up.

3. A collapsible carrier, comprising a main body section having flexible transverse carrier slats interconnected intermediate their ends by spaced longitudinal body slats, and by longitudinal marginal members at their ends; said marginal members having hand grip members secured to their intermediate portions; end members hingedly connected to the intermiate portions of the transverse ends of said body section; cooperative separable fastener devices connected with and adapted to secure said end members and main body section in set up relation; a secondary transverse slat secured to certain of said body slats intermediate and parallel to said carrier slats, said secondary slat having free ends disposed to extend exteriorly over the adjacent side portions of said main body section, and said free ends having cooperative fastening means for separably securing the same together.

4. A collapsible carrier, comprising a main body section having flexible transverse carrier slats interconnected intermediate their ends by spaced longitudinal body slats, and by longitudinal marginal members at their extermities; said marginal members having hand grip members secured to their intermediate portions; end members hingedly secured to the intermediate portions of the transverse ends of said body section, said end members having substantially converging side edges, and being further provided at their free ends with a centrally disposed indented receiving socket; cooperative separable fastener devices connected with and adapted to secure said end members and main body section in set up relation; and said marginal members having tongues projecting exteriorly beyond the transverse ends of said body section, whereby, when said carrier is set up and closed, said marginal members may be disposed in inwardly and downwardly directed face to face relation with said tongues entered in said receiving sockets of said end members.

5. A collapsible carrier, comprising a main body section having flexible transverse carrier slats interconnected intermediate their ends by spaced longitudinal body slats, and by longitudinal marginal members at their extremities; said marginal members having hand grip members secured to their intermediate portions; end members hingedly secured to the intermediate portions of the transverse ends of said body section, said end members having substantially converging side edges, and being further provided at their free ends with a centrally disposed indented receiving socket; cooperative separable fastener devices connected with and adapted to secure said end members and main body section in set up relation, said marginal members having tongues projecting exteriorly beyond the transverse ends of said body section, whereby, when said carrier is set up and closed, said marginal members may be disposed in inwardly and downwardly directed face to face relation with said tongues entered in said receiving sockets of said end members; and fastening means connected with said main body section for securing the same in closed condition when operatively set up.

6. A collapsible carrier, comprising a main body section having flexible transverse carrier slats interconnected intermediate their ends by spaced longitudinal body slats, and by longitudinal marginal members at their extremities; said marginal members having hand grip members secured to their intermediate portions; end members hingedly secured to the intermediate portions of the transverse ends of said body section, said end members having substantially converging side edges, and being further provided at their free ends with a centrally disposed indented receiving socket; cooperative separable fastener devices connected with and adapted to secure said end members and main body section in set up relation; said marginal members having tongues projecting exteriorly beyond the transverse ends of said body section, whereby, when said carrier is set up and closed, said marginal members may be disposed in inwardly and downwardly directed face to face relation with said tongues entered in said receiving sockets of said end members; a secondary transverse slat secured to certain of said body slats intermediate and parallel to said carrier slats, said secondary slat having free ends disposed to extend exteriorly over the adjacent side portions of said main body section, and said free ends having cooperative fastening means for separably securing the same together.

7. A collapsible carrier, comprising a main body section having flexible transverse carrier slats interconnected intermediate their ends by spaced lonigtudinal body slats, and by longitudinal marginal members at their extremities; said marginal members having hand grip members secured to their intermediate portions; end members hingedly secured to the intermediate portions of the transverse ends of said body section, said end members having substantially converging side edges, and being further provided at their free ends with a centrally disposed indented receiving socket; cooperative separable fastener devices connected with and adapted to secure said end members and main body in set up relation, and certain of said body slats of said main body section being disposed to project exteriorly beyond the outer edges of said transverse carrier slats, to form shoulders engageable with and stopped against the side edges of said end members when the carrier is in set up condition.

8. A collapsible carrier, comprising a main body section having flexible transverse carrier slats interconnected intermediate their ends by spaced longitudinal body slats, and by longitudinal marginal members at their extremities; said marginal members having hand grip members secured to their intermediate portions; end members hingedly secured to the intermediate portions of the transverse ends of said body section, said end members having substantially converging side edges, and being further provided at their free ends with a centrally disposed indented receiving socket; cooperative separable fastener devices connected with and adapted to secure said end members and main body in set up relation; certain of said body slats of said main body section being disposed to project exteriorly beyond the outer edges of said transverse carrier slats to form shoulders engageable with and stopped against the side edges of said end members when the carrier is in set up condition; and fastener means connected with said main body section for securing the same in closed condition when operatively set up.

9. A collapsible carrier, comprising a main body section having flexible transverse carrier slats interconnected intermediate their ends by spaced longitudinal body slats, and by longitudinal marginal members at their extremities; said marginal members having hand grip members secured to their intermediate portions; end members hingedly secured to the intermediate portions of the transverse ends of said body section, said end members having substantially converging side edges, and being further provided at their free ends with a centrally disposed indented receiving socket; cooperative separable fastener devices connected with and adapted to secure said end members and main body in set up relation; certain of said body slats of said main body section being disposed to project exteriorly beyond the outer edges of said transverse carrier slats to form shoulders engageable with and stopped against the side edges of said end members when the carrier is in set up condition; a secondary transverse slat secured to certain of said body slats intermediate and parallel to said carrier slats, said secondary slat having free ends disposed to extend exteriorly over the adjacent side portions of said main body section; and said free ends having cooperative fastening means for separably securing the same together.

10. A collapsible carrier, comprising a main body section having flexible transverse carrier slats interconnected intermediate their ends by spaced longitudinal body slats, and by longitudinal marginal members at their extremities; said marginal members having hand grip members secured to their intermediate portions; end members hingedly secured to the intermediate portions of the transverse ends of said body section, said end members having substantially converging side edges, and being further provided at their free ends with a centrally disposed indented receiving socket; cooperative separable fastener devices connected with and adapted to secure said end members and main body in set up relation; certain of said body slats of said main body section being disposed to project exteriorly beyond the outer edges of said transverse carrier slats to form shoulders engageable with and stopped against the side edges of said end members when the carrier is in set up condition; and said marginal members having tongues projecting exteriorly beyond the transverse ends of said body section, whereby, when said carrier is set up and closed, said marginal members may be disposed in inwardly and downwardly directed face to face relation with said tongues entered in said receiving sockets of said end members.

11. A collapsible carrier, comprising a main body section having flexible transverse carrier slats interconnected intermediate their ends by spaced longitudinal body slats, and by longitudinal marginal members at their extremities; said marginal members having hand grip members secured to their intermediate portions; end members hingedly secured to the intermediate portions of the transverse ends of said body section, said end members having substantially converging side edges, and being further provided at their free ends with a centrally disposed indented receiving socket; cooperative separable fastener devices connected with and adapted to secure said end members and main body in set up relation; certain of said body slats of said main body section being disposed to project exteriorly beyond the outer edges of said transverse carrier slats to form shoulders engageable with and stopped against the side edges of said end members when the carrier is in set up condition; said marginal members having tongues projecting exteriorly beyond the transverse ends of said body section, whereby, when said carrier is set up and closed, said marginal members may be disposed in inwardly and downwardly directed face to face relation with said tongues entered in said receiving sockets of said end members; and fastening means connected with said main body section for securing the same in closed condition when operatively set up.

12. A collapsible carrier, comprising a main body section having flexible transverse carrier slats interconnected intermediate their ends by spaced longitudinal body slats, and by longitudinal marginal members at their extremities; said marginal members having hand grip members secured to their intermediate portions; end members hingedly secured to the intermediate portions of the transverse ends of said body section, said end members having substantially converging side edges, and being further provided at their free ends with a centrally disposed indented receiving socket; cooperative separable fastener devices connected with and adapted to secure said end members and main body in set up relation; certain of said body slats of said main body section being disposed to project exteriorly beyond the outer edges of said transverse carrier slats to form shoulders engageable with and stopped against the side edges of said end members when the carrier is in set up condition; said marginal members having tongues projecting exteriorly beyond the transverse ends of said body section, whereby, when said carrier is set up and closed, said marginal members may be disposed in inwardly and downwardly directed face to face relation with said tongues entered in said receiving sockets of said end members; a secondary transverse slat secured to certain of said body slats intermediate and parallel to said carrier slats, said secondary slat having free ends disposed to extend exteriorly over the adjacent side portions of said main body section, and said free ends having cooperative fastening means for separably securing the same together.

In testimony, that I claim the invention set forth above I have hereunto set my hand this 17th day of March, 1926.

RUSSELL WHITCOMB.